Figure 1:
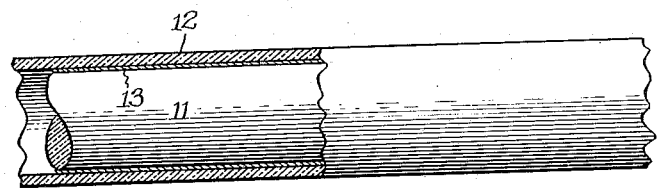

March 24, 1931.  E. J. CONLAN  1,797,855

GLASS BAR

Filed May 19, 1930

Inventor:
Edward J. Conlan
By Walter M. Fuller Atty.

Patented Mar. 24, 1931

1,797,855

UNITED STATES PATENT OFFICE

EDWARD JAMES CONLAN, OF BROOKLYN, NEW YORK, ASSIGNOR TO KIMBLE GLASS COMPANY, OF VINELAND, NEW JERSEY, A CORPORATION OF ILLINOIS

GLASS BAR

Application filed May 19, 1930. Serial No. 453,617.

My invention pertains to compound or built-up glass or similar rods or bars for any purpose, but pertains more particularly to structures of this kind intended for use as towel bars in bathrooms and elsewhere, one object of the invention being to provide an assembled bar of this type having one or more colors or designs, the construction being such that the colors or configurations will have special artistic merit and outstanding brilliancy.

The invention concerns not only the finished bar, but also its method of manufacture.

To enable those skilled in this industry to have a full and complete understanding of the invention and its various advantages, in the accompanying drawing, forming a part of this specification, and to which reference should be had, I have illustrated a present, preferred embodiment of the invention possessing the above-specified and other desirable characteristics, and, for simplicity, like parts in the views have been designated with the same reference numerals. In this drawing:—

Figure 2:
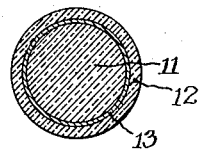

Figure 1 is a fragment of such rod or bar shown partly in elevation and partly in central, longitudinal section; and Figure 2 is a cross-section through the improved structure.

Referring to such drawing, it will be understood that the compound or composite glass-bar comprises an inner, cylindrical glass-rod 11 and an outer, encasing or enclosing, cylindrical glass-tube 12, the two parts fitting more or less snugly together, one inside of the other, but with a thin, annular space between them which is filled with a cementitious material 13.

The glass rod or tube, or both, may be transparent, translucent or opaque and either colored or colorless.

The cement or binding material between the two fitted elements may be transparent and colored, transparent and colorless, opaque or semi-opaque and colored, opaque or semi-opaque and colorless, and with or without design or pattern, such as mottled, adventurine, variegated colors, etc.

Such intermediate or interposed bonding unit or cohering medium may be gelatin, gelatin composition, or any cellulose material, such as celluloid, nitrocellulose, cuproammonium cellulose, viscose or acetate cellulose, or any resinous material made from natural, refined, manufactured or synthetic material, such as varnish gum, shellac, gum arabic, phenol resins or other synthetic products of resinifying reactions, glue, as made from bones, casein, or any other source, waxes, such as paraffin wax, beeswax, carnauba wax, ceresin wax, or asphaltic materials, casein and other plastic, rubber, or any other material which will properly serve as a binder between the rod and tube.

There are several ways in which the compound rod may be manufactured, as for instance, the rod may be inserted in the tube and the cementing material forced between them by pressure, or the rod may be placed in the tube and the cementing material caused to fill the space between them by suction, or the assembled rod and tube may be inserted in a bath of cementing material and removed therefrom after the material has filled the space between the two elements of the assembly, and the excess material wiped from its outside, or the combining material may be applied to the rod or to the inside of the tube or to both and the parts assembled, thus forcing out the surplus, or such material may be applied as a coating to the inside of the tube and/or on the rod, whereupon the latter may be inserted in the tube and then another cementing material or more of the same may be sucked or forced into the remaining space between the members, or a rod and an encasing tube of cellulose material and an outer tube of glass may be assembled and then any other appropriate substance may be forced or sucked into the clearance space between the elements which causes the cellulose tube to adhere to both the rod and tube, and such introduced material may or may not be a solvent for the cellulose tube.

The character or color of the cementing material may change and/or the cementing improve after assembly, due to an evaporation, melting, polymerization, solidification or other natural chemical or physical process, and such changes may be brought about by heat, suction, pressure or application of chemicals to the assembled bar.

A typical and perhaps preferred method of producing such bar is to insert the glass rod into the tube, and when thus assembled, they are set upright in a warm solution of colored gelatin, whereupon a suitable fixture is connected to the upper end of the tube and suction applied, causing the gelatin to ascend into and to fill the clearance space between the rod and the tube.

When such solution has risen to the top of the rod, the valve on the suction fixture is closed and the fixture or connection disconnected from the vacuum line.

The assembly and the attached fixture are then removed from the gelatin bath, the solution being held in the space between rod and tube by barometric pressure, capillarity, or both.

On cooling, the gelatin solidifies, the fixture is demounted, and the surplus gelatin is removed from the outside of the now completed bar.

Those skilled in this art will readily understand that this invention, as defined by the appended claims, is not necessarily limited to the precise and exact details presented above, and that various modifications may be resorted to without departure from the substance of the invention and without the sacrifice of any of the substantial benefits or advantages.

I claim:

1. A composite glass-bar, comprising in combination a glass-rod, a glass-tube encasing said rod, and a cementing medium between and binding said rod and tube together.

2. A composite glass-bar, comprising in combination a colored glass-rod, a glass-tube encasing said rod, and a cementing medium between and binding said rod and tube together.

3. A composite glass-bar, comprising in combination a glass-rod, a colored glass-tube encasing said rod, and a cementing medium between and binding said rod and tube together.

4. A composite glass-bar, comprising in combination a glass-rod, a glass-tube encasing said rod, and a colored cementing medium between and binding said rod and tube together.

5. A composite glass-bar, comprising in combination a colored glass-rod, a colored glass-tube encasing said rod, and a cementing medium between and binding said rod and tube together.

6. A composite glass-bar, comprising in combination a colored glass-rod, a glass-tube encasing said rod, and a colored cementing medium between and binding said rod and tube together.

7. A composite glass-bar, comprising in combination a glass-rod, a colored glass-tube encasing said rod, and a colored cementing medium between and binding said rod and tube together.

8. A composite glass-bar, comprising in combination a colored glass-rod, a colored glass-tube encasing said rod, and a colored cementing medium between and binding said rod and tube together.

9. The method of making a composite glass-bar, comprising fitting a glass-rod inside of an encasing glass-tube, and filling the space between said rod and tube by causing a binding medium to flow into and to fill such space by different pressures applied to the ends of the bar.

10. The method of making a composite glass-bar, comprising fitting a glass-rod inside of an encasing glass-tube, and filling the space between said rod and tube by immersing one end of the composite bar in a liquid bath and applying suction to the other end of the bar.

11. The method of making a composite glass-bar, comprising fitting a glass-rod inside of an encasing glass-tube, and filling the space between said rod and tube by causing a colored liquid cementing medium to flow into and to fill such space.

12. The method of making a composite glass-bar, comprising fitting a glass-rod inside of an encasing glass-tube, and filling the space between said rod and tube by causing a liquid cement to flow into and to fill such space.

13. The method of making a composite glass-bar, comprising fitting a glass-rod inside of an encasing glass-tube, and filling the clearance space between said rod and tube by causing a colored liquid cement to flow into and to fill such space.

14. The method of making a composite glass-bar comprising fitting a glass-rod inside of an encasing glass-tube, and filling the space between said rod and tube by immersing at least one end of the composite bar in a liquid cement and applying suction to the other end of the bar.

15. The method of making a composite glass-bar, comprising fitting a glass-rod inside of an encasing glass-tube, and filling the space between said rod and tube by immersing the one end of the composite bar in a bath of liquid cement, applying suction to the other end of the bar, and maintaining the suction application until the cement has bound the rod and tube together.

16. The method of making a composite glass-bar, comprising fitting a glass-rod inside of an encasing glass-tube and binding said rod and tube together by a cementing medium occupying the space between them.

In witness whereof I have hereunto set my hand.

EDWARD J. CONLAN.